United States Patent
Impey et al.

(10) Patent No.: US 6,614,895 B1
(45) Date of Patent: Sep. 2, 2003

(54) MAINTAINING A CUSTOMER DATABASE IN A CTI SYSTEM

(75) Inventors: Alan Adrian Impey, Salisbury (GB); Colin James Thorne, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,322

(22) Filed: Mar. 6, 2000

(30) Foreign Application Priority Data

Mar. 6, 1999 (GB) .............................. 9905073

(51) Int. Cl.[7] ............................................. H04M 15/00
(52) U.S. Cl. ............................... 379/127.01; 379/265.02
(58) Field of Search ................... 379/127, 133, 379/265, 266, 88.2, 127.01, 127.06, 134, 136, 265.02, 265.05, 265.13, 266.1

(56) References Cited

U.S. PATENT DOCUMENTS

| | | | | |
|---|---|---|---|---|
| 5,805,688 A | * | 9/1998 | Gillespie et al. | ....... 379/221.08 |
| 5,982,866 A | * | 11/1999 | Kowalski | ............... 379/127.06 |
| 6,137,870 A | * | 10/2000 | Sherer | |
| 6,148,065 A | * | 11/2000 | Katz | |
| 6,185,290 B1 | * | 2/2001 | Shaffer et al. | ......... 379/220.01 |
| 6,233,333 B1 | * | 5/2002 | Dezonmo | |

\* cited by examiner

Primary Examiner—Curtis Kuntz
Assistant Examiner—Barry W Taylor
(74) Attorney, Agent, or Firm—Fay, Sharpe, Fagan, Minnich & McKee, LLP

(57) ABSTRACT

This invention relates to maintaining a customer database in a computer telephony integrated (CTI) database. In particular it relates to populating and maintaining a customer database in a computer telephony system with shared and unique telephone numbers. There is described a method, apparatus and a computer program product relating to the processing records in a telephony database. The telephony system receives an ANI number along with an incoming call and uses that number to identify records, if any, in the customer database having telephone numbers that match the ANI number. A new record is created in the database if no record from the identified records corresponds to the incoming telephone call and the new record includes a telephone number field containing the ANI number. If one or more records were identified in the database the telephone number in the new record is associated with a shared status.

36 Claims, 6 Drawing Sheets

MAINTAINING A CUSTOMER DATABASE IN A CTI SYSTEM

FIELD OF INVENTION

This invention relates to maintaining a customer database in a computer telephony integrated (CTI) database. In particular it relates to populating and maintaining a customer database in a computer telephony system with shared and unique telephone numbers.

BACKGROUND OF INVENTION

A call center can be defined as a system that handles inbound (incoming) and/or outbound (outgoing) telephone calls to/from a company's customers in support of its day-to-day operation. For instance a telemarketing area, where the employees make outgoing calls to try and sell the company's products or a service area that receives incoming calls from its customers for repair or maintenance of the company's goods or services. A call center will have a telephone system which may be as simple as a small single-line phone, increasing in complexity up to a large multi-node PBX. Typically a call center comprises a group of telephone operators having personal computers in a network connected to the customer database.

It is becoming increasingly common practice for companies to integrate their customer databases with their telephone call center operation to improve operational efficiency. For example, a customer may dial into the call center to make some payments or changes to an account held in a customer database. The operator answering the telephone call needs to identify the customer and his request, find the account in the database and make the appropriate entries. This takes time if conducted manually; however, the process of identifying a customer and locating an account is an automated task for computer and telephony integrated systems (CTI). The telephone system provides call line information (CLI) accompanying the call and this identifies the customer's telephone number. This number is also called automated number identification (ANI). The computer system receives the ANI information from the telephony network and searches amongst its records in the database for a matching account. If such an account is found, then it is selected and displayed for the operator.

Typically, when a company introduces a CTI solution into their call center, the telephone information is not considered valuable or significant prior to the introduction of the CTI solution. This lack of accurate information means that the benefits of CTI will not be realized until accurate telephone number information about the call center's customers has been acquired. Acquiring the information is not a trivial exercise; a mailing campaign would probably have poor response, as customers typically react negatively to being asked for personal information.

SUMMARY OF INVENTION

Accordingly, one aspect of the invention provides a method of processing records in a telephony database comprising:
 receiving an ANI number from an incoming call;
 identifying records, if any, in the database with telephone numbers that match said ANI number;
 creating a new record if no record from the identified records corresponds to the incoming telephone call, said new record including a telephone number field containing said ANI number; and
 associating the telephone number in the new record with a shared status if one or more records have been identified in the database.

In this way, the telephone number in the record associated with (corresponding to) the incoming call is automatically assigned a shared status if another record exists in the database having the same telephone number. This occurs most usually in the case of customers having the same place of work and where the ANI is the same. It is the agent who determines if a record corresponds to a caller by selecting or not selecting one of the records.

In practice, the ANI data is not always unique to one record and multiple records can be located. When dealing with the general public rather than with companies, a call center that uses a CTI application will need to associate more than one telephone number with each customer. These numbers are typically the home, mobile or work numbers. The home number is the private telephone of the customer, usually, associated with their place of residence. The mobile number is also a private number. The work number is the number of their place of work and, as such, may be used by other customers who also work at that location.

When an inbound call is received by the call center, the CTI application will present the agent with options on how to handle the call. These options depend on whether the ANI information associated with the call corresponds to either the work or home number stored in the database. The CTI application can immediately display a customer's account information if the ANI is the home number. In the case of the work number, the caller could be any one of the customers who have access to this telephone. The application program must first display a list of all the customers who have this number in their records. The agent should then greet the customer, identify them, and then select the caller from the list, so displaying the particular account details.

A frequent occurrence and problem in a call center is that of the abandoned call. The CTI application will place different significance on home and work numbers. Abandoned calls can only be returned successfully if there is a high probability of contacting their customer directly. This cannot be achieved by returning a call to a work number which more often than not will be the firm's switchboard. Abandoned calls fire more likely to be reconnected when made to a customer calling from their home phone number and more likely their mobile number. However, it may also be that a home phone number is not strictly unique in the sense that a home is shared by a family or another group of people. In this case it may be advantageous to have 3 categories: unique (mobile phone or unique home phone number); seem shared (shared home phone number); and shared (work number or similar). This may be achieved by using a non-binary status field associated with the telephone number.

Several scenarios can occur after a search of the database:
 a) It may be that no matching records are selected in the database. In this case a new record is created in the database with the ANI number in a telephone number field. Since no other records are found, then the ANI number may be unique.
 b) It may be that one matching record is located and this is the corresponding record. In this case a new record is created in the database with the ANI number in the telephone number field.
 c) Since there are two records having the ANI number in their telephone phone fields, these numbers are not unique and are deemed shared numbers. This last scenario also occurs if more than one matching record is found but none of them is the corresponding record.

The record that corresponds to the incoming call is not necessarily any of those that have been selected from the database using the ANI number. For instance, if an existing customer is calling from a number not usually associated with him, other records may be located in the ANI search which do not correspond with the incoming call. The operator determines the name of the caller through conversation and picks a record from the database which was not initially matched. The record picked by the operator is the corresponding record to the call.

Preferably, the method also involves checking the shared status of each corresponding telephone number in the existing records. This will occur in the case where only one customer is using a work number to connect to the call center and when a second customer connects to the call center using this work number. It may also occur when the database has not been maintained to keep track of all the existing shared numbers. In the former case the database search and selection of the corresponding record will reveal that the ANI number is not unique and will indicate that the number is a shared number. Both the entry in the second customer's account and the entry in the first customer's account are set as shared telephone numbers.

The method may associate the telephone number field with a unique status if no matching record is selected. This will allow the telephone number to be uniquely identified as non-shared so that call-back resources may be optimized.

During the course of an operator/caller interaction, it may be ascertained whether the ANI number acquired is in fact a unique or shared number rather than assumed from existing database data. Advantageously, the method further provides associating the telephone number field with a verified or unverified status whereby the shared or unique status has been confirmed or not. Further assumptions can be made and benefits derived if the actual status of the telephone number is known rather than assumed.

A further advantage is provided by associating the telephone number with a primary or secondary status depending whether the value in the telephone number field is respectively the main phone number or another less used number. Call-back resources are optimized for unique numbers. However, if the unique number is a secondary unique number then the probability of achieving a successful call-back is diminished and a schedule could use this information to prioritize calls.

When a search on an incoming call identifies a record not being associated with the call but having a matching telephone number which is verified unique status, a new record is created and the new telephone number is associated with a secondary unique status.

The telephone field may be associated with a usage count for indicating the number of times the record has been located by the value in the telephone number field. This allows entries in the database to be placed in priority sequence as the search is taking place. For example, as results are presented to the agent as they are located, the mostly commonly accessed records are chosen first. This saves on agent, customer and processing time if a record can be selected before the full search of the database has been carried out. It also provides the information that allows a decision to be made as to which telephone number to discard when the number of telephone numbers in the database has become limiting.

The telephone field may be associated with a date for indicating the date when the record was last selected giving advantages as mentioned above.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
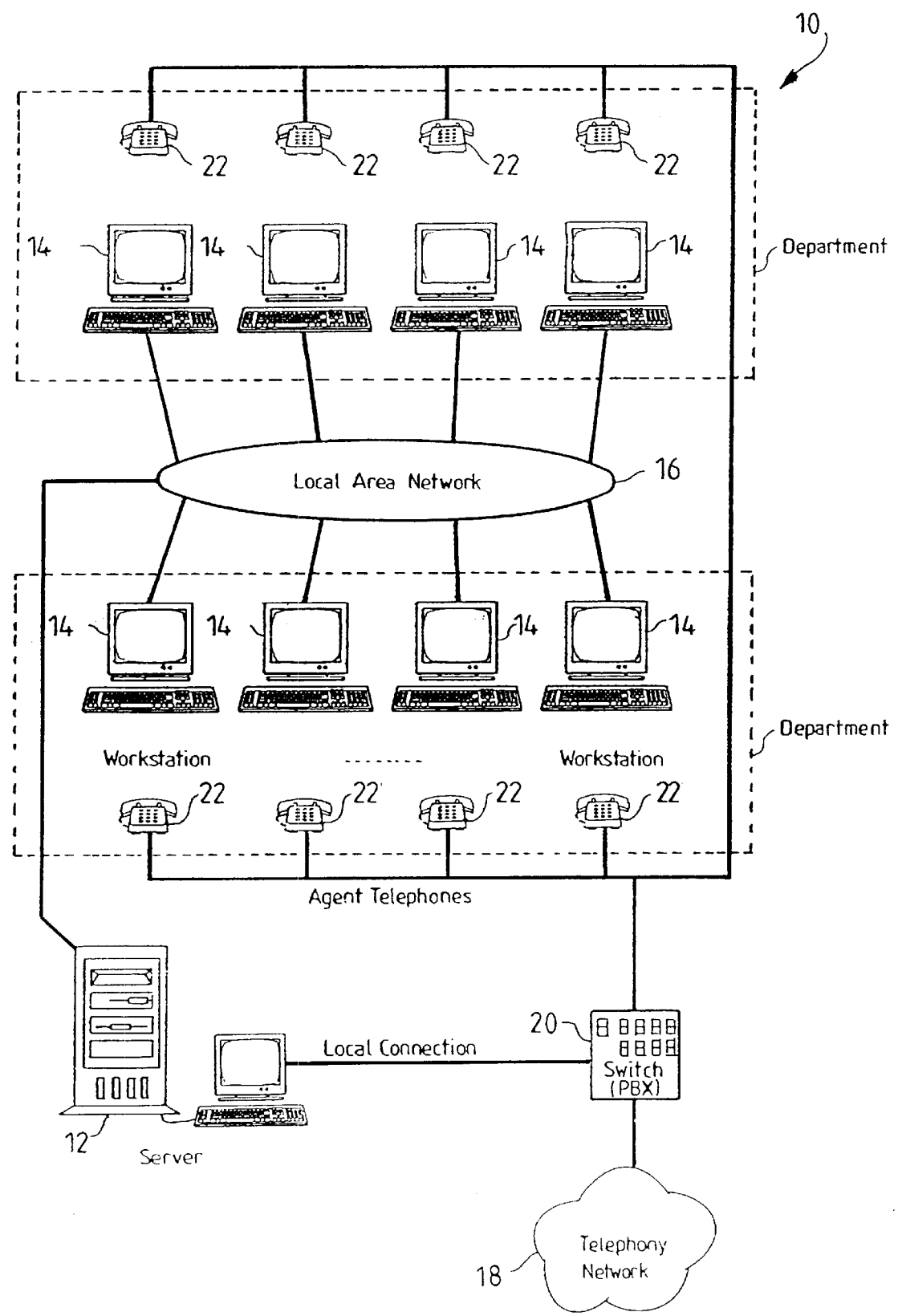
FIG. 1 is a schematic representation of a call center of the embodiment.

Referring to FIG. 1 there is shown a typical call center 10 or Automatic Call Distribution (ACD) arrangement. A PC based computer server 12 is connected to a number of PC based computer clients 14 or agent workstations by a local area network (LAN) 16. The server 12 has a data link to a telephony network 18 through a switch 20. Connected to the telephony network through the switch 20 are agent telephones 22 corresponding to each of the agent workstations 14. The switch 20 makes, breaks, or changes the connections between telephone lines in order to establish, terminate, or change a telephone call path. It is typically a private branch switch residing on the same premises as the server 12. In the preferred embodiment the switch 20 is a Lucent switch but could be one of many suitable switches provided amongst others by Siemens, Nortel or Alcatel. The switch provides network information to the telephony application, such as ANI (Answer Number Identification, also known as CLI—Caller Line Identification) and DNI (Dialled Number Identification).

Figure 2:
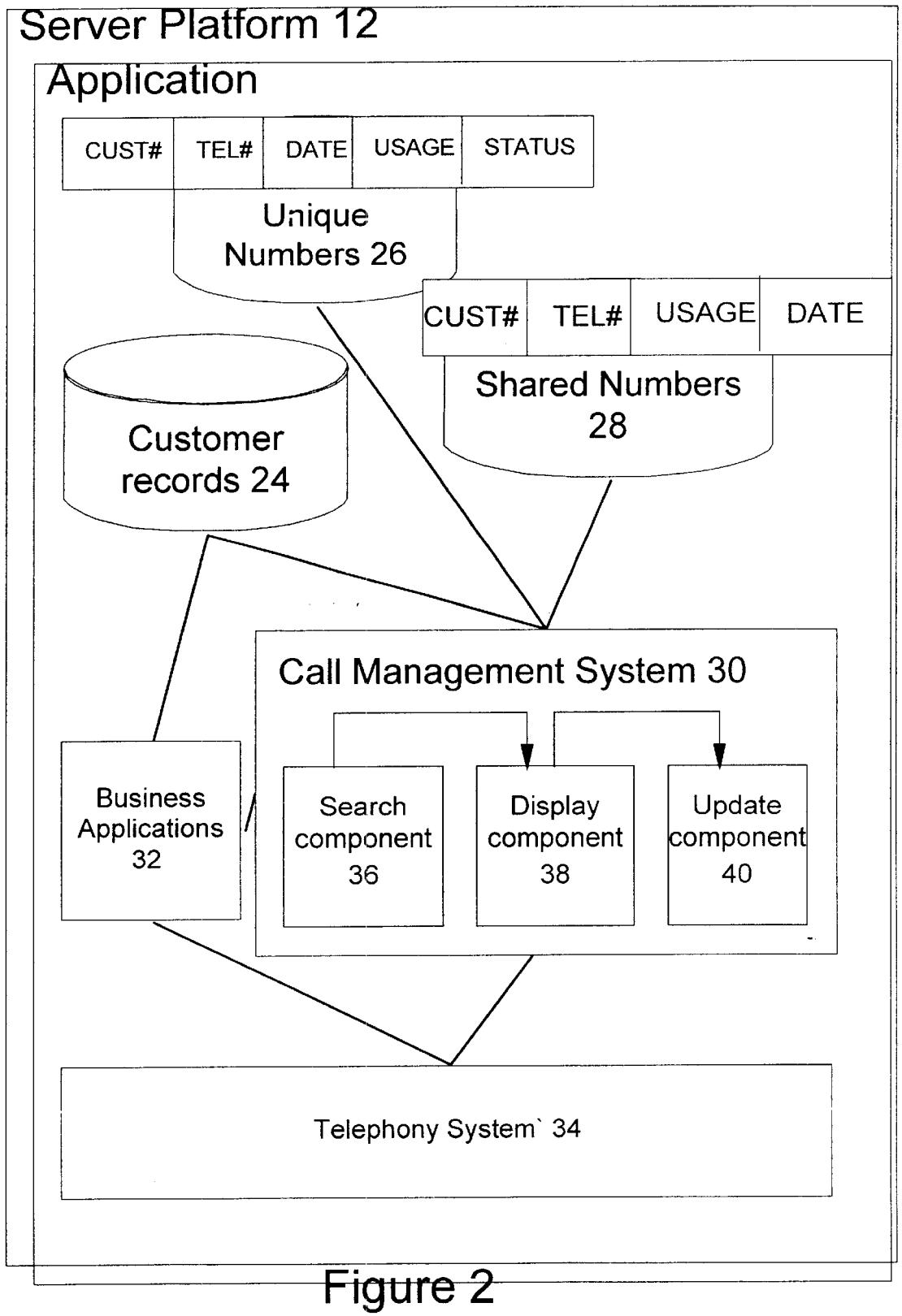
FIG. 2 is a more detailed representation of the platform on which the embodiment resides.

The server 12 is typically a 400 Mhz Pentium based PC with 192M bytes of memory, 25G bytes of hard drive, keyboard, mouse, and VDU connected to the LAN using an Ethernet card. A suitable operating system is OS/2 Warp but Microsoft's Windows NT* would also be suitable (see FIG. 2). The platform and operating system provide the environment for a customer record database 24; a unique telephone numbers database 26; a shared telephone numbers database 28; a Call Management System 30; business applications 32 and a telephony system 34. The telephony system 34 controls the switch 12 for the call center and performs intelligent dialling functions and transfer calls function. Such a system could be IBM DirectTalk or similar. The call management system 30 provides the functionality of the embodiment and comprises search component 36; display component 38; and update component 40. The components may be methods in a single call management object in a language such as C++ or individual routines in a procedural language.

Each workstation 14 is typically a Pentium microprocessor based PC with 32M bytes of memory, 4Gbytes of hard drive, keyboard, mouse and VDU connected to the LAN using an Ethernet card. A suitable operating system is IBM's OS/2 Warp running a workstation application which communicates with the call management system 30, business application 32 and telephony system 34 on the server. Typically the workstation will have client versions of the business applications which communicate with the server versions of the business applications 32.

One example of a business application is telesales application which prompts an agent with certain selling strategies for use with a customer. Another example is a sales order application which will accept input from an agent so that sales details can be taken. Another example is a customer enquiry application which accepts input from an agent regarding a customer problem for instance a brief description of the problem, the time which it is entered, and the priority which with it should be handled. In the above examples, the telephony system communicates an ANI number to the call management system 30 with each new call. The call management system uses the ANI number to help identify a customer record in the customer record database 24 by searching through the unique telephone number database 26 and the shared telephone number database 28 for matches.

In the preferred embodiment the telephony numbers are stored separately from the customer records in a relational database structure. This gives the benefit of faster searching through a more compact database. However, the telephone numbers could also be stored in the customer records as a single flat structure. Furthermore, the telephone numbers are stored in separate databases according to their type which can give a speed advantage if the source of the most likely hits, the unique numbers, is searched first. However, the unique and shared numbers could also be stored in a single database with a type field indicating whether they were shared or unique. A single telephone number database would be advantageous in terms of compactness if it were desirable to categorize the telephony number into more than two types. In the present embodiment unique telephone number records have the following fields: a customer number field so that the record can be linked (as required for a relational database) into the customer database; a telephone number field; a last used date field; a usage count field; and a status field. The status field is for indicating to the call management system 30 whether the unique telephone number is 'primary' or 'secondary.' A 'primary' status indicates that the number has been verified as the residence of the customer. A 'secondary' status indicates, for example, that this is not the customer's main phone number. For instance, it may be that of a neighbor and identifies the situation where a customer has 'popped-in' from next door and used the neighbor's phone to contact the call center. If the status is neither primary nor secondary, then it is regarded as unverified as the residence of the customer.

The search component controls the process of checking through the telephone number databases to locate entries matching the ANI number. The switch acquires the ANI number and other information from an inbound call before connecting the call to an agent.

Figure 3:
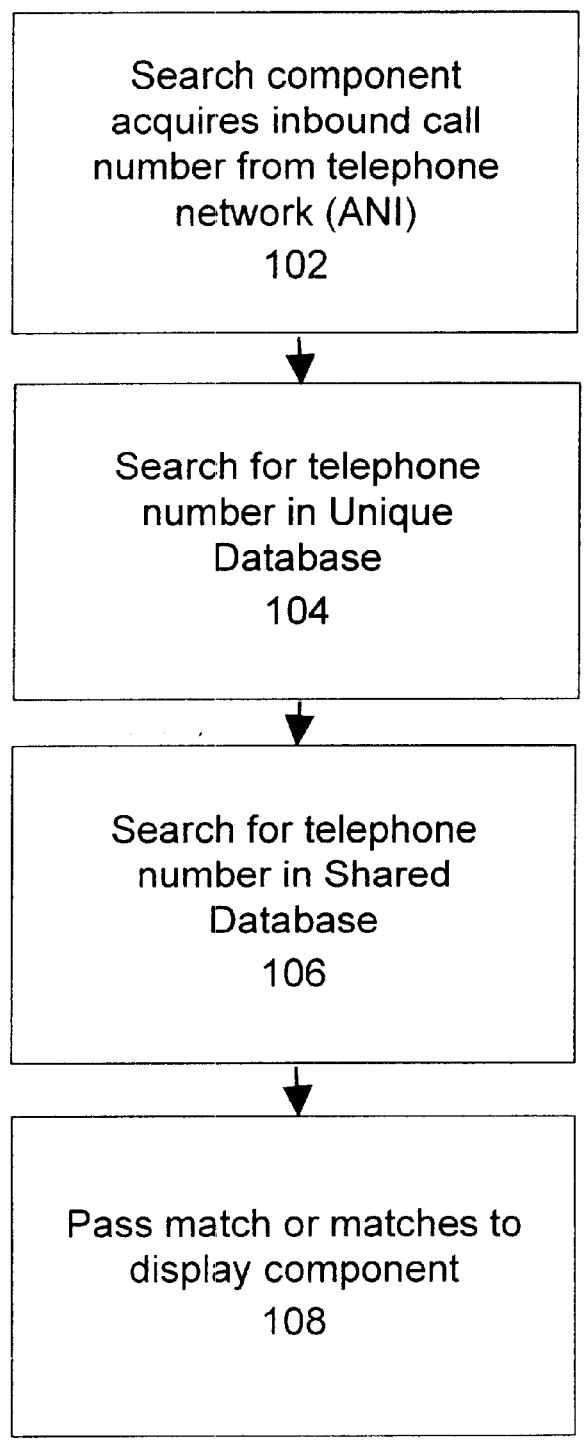
FIG. 3 is a flow chart of the search method used in the present embodiment.

Regarding FIG. 3, the ANI number is passed to the server and is acquired by the search component (step 102). The search component queries the unique telephone number database first (step 104). As each match is found, it is passed to the display component (represented at step 108). The most probable telephone numbers are arranged at the beginning of the database to enhance process speed. Telephone numbers in the shared database are searched (step 106) next and the matches are passed to the display component (step 108) as they are located as for the unique database.

In the description the term matching record is used for records identified by the computer ANI search and the term selected record is used for records identified by the agent.

Figure 4:
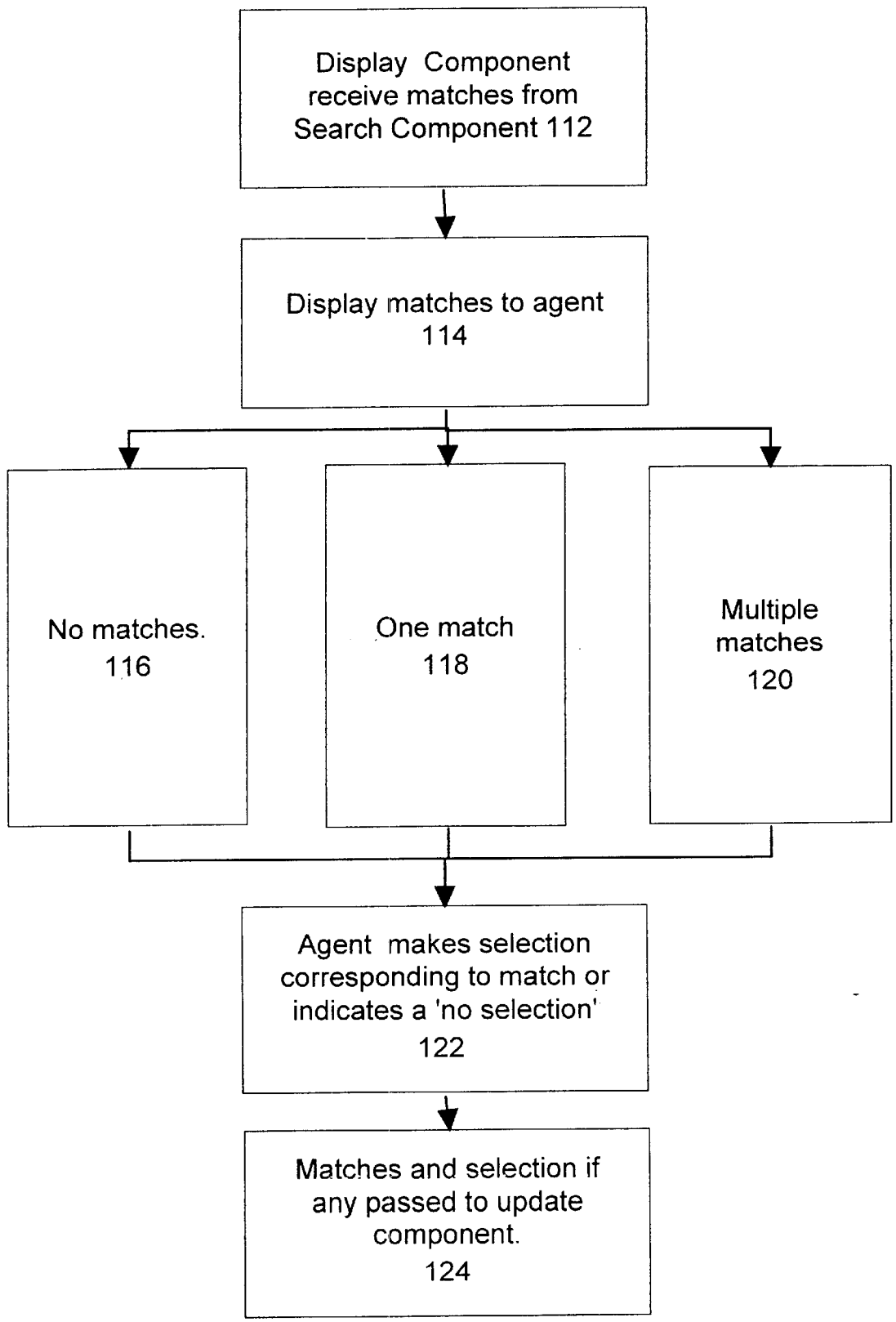
FIG. 4 is a flow chart of the method used to display entries in the customer database of the embodiment.

Regarding FIG. 4, the display component provides a graphical user interface between the call management system and the agent. The matches are received from the search component in sequential fashion (112) and displayed on the screen to the agent (114) so that the agent can select a match or choose a 'no selection' option. Normally, this will involve the agent asking the caller to identify himself and selecting the match or 'no selection' with the mouse cursor GUI interface or a menu option selected by the keyboard. The agent may verify the selection using a password and then confirm or deny the selection. During the interaction with the customer, the agent may elicit information as to the type of phone that the customer is using, for instance, by confirming that the number is a home phone number. The status of the number may then be changed directly by the agent.

If no matches are located from either the unique or shared databases, none are displayed and none can be selected (116). In this case the 'no selection' decision can be made by the search component rather than the agent. If there is a single match (118), the agent has two choices and must indicate whether the caller corresponds to this match or not (122). The single match would most likely come from the unique database as the shared database should not contain such matches. However, there is no serious inconsistency if a single match is found in the shared database and the update component may optionally change a single match in the shared database to the unique database. Multiple matches will most likely come from the shared database (120) then the agent must choose between them or indicate a 'no selection' (124). If multiple matches come from the unique database, they might be advantageously moved into the shared database. The matches and selection or 'no selection' are then passed to the update component.

Figure 5A:
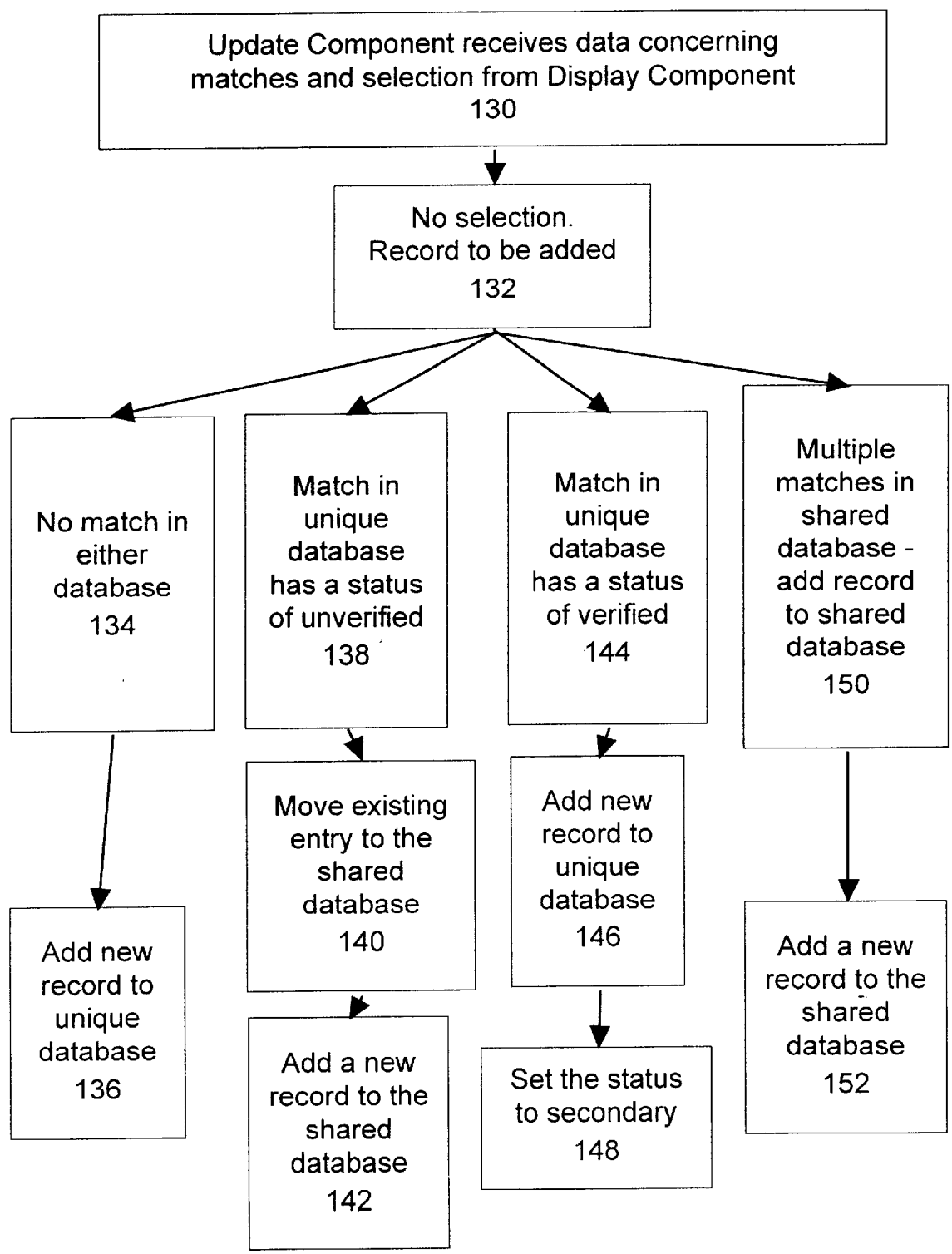
FIGS. 5A and 5B are flow charts of the methods used to update the customer database.

Regarding FIG. 5A, the update component 40 makes changes to the unique and shared telephone number databases. In the case that a 'no selection' is made by the agent, a new record must be added to the telephone number databases. The update component receives data from the display component 38 concerning the matches previously made (if any) and any selection made on the matches (130). The data is queried and 'no selection' is identified indicating that a record is to be added to one of the databases (132). The question is which database. The most likely scenarios are now described. If no match is found in either database (134), a new record is added to the unique database (136). If there is a match in the unique database which is not selected, then a new 'shared' telephone number is indicated (138). The existing match is moved to the shared database (140) and a new record is added to the shared database (142). This scenario occurs for unique telephone numbers that are not verified. If a match in a unique-database has a status of verified and the caller is not the same as the match (144), then a new record is added to the unique database (146). This may be in the case where two customers in the same family use the same phone. Alternatively an existing customer, not matched, may be using someone else's phone which is matched. In this case no new record need be set up, but the existing customer may be given a new telephone number record which has a secondary status (148). If multiple matches are found in the shared database (150), then a new record is added to the shared database (152). In the above cases where a new record is created, for each new record the usage count is set to one and the last used date field is set to the current date.

Figure 5B:
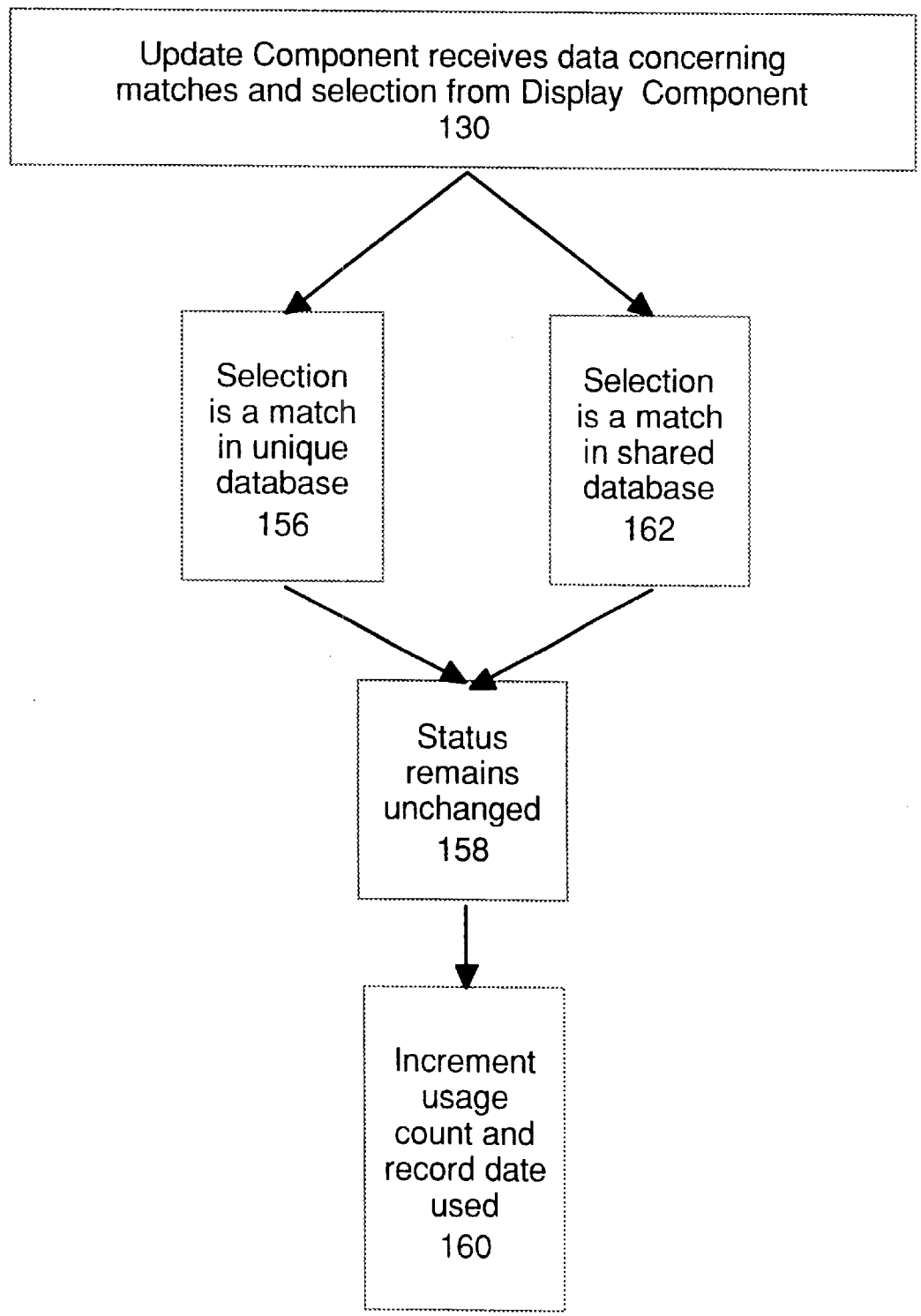

Regarding FIG. 5B, in the case where a 'selection' is made by the agent from the match found by the search component in the unique database (156), the status of the record remains unchanged (158). The usage count is incremented and the date field updated (160). The process is essentially the same for the case where a 'selection' is made by the agent from matches found by the search component in the shared database (162).

Each customer record has two groups of fields: one holds information about the caller's unique numbers; the other holds information about the caller's shared numbers. Each telephone number entry within these two groups has additional fields associated with it: Usage count—A count of the number of times the field has been used. Date—The date that the telephone number was last used.

A further field, 'status' is only used in the group of unique numbers, and it has three possible values: Verified, secondary and unverified.

Verified, indicates that this number has been verified as the residence of the customer.

Secondary, indicates that the phone number may be a neighbor's and enables the CTI application to identify the situation where a customer has 'popped-in' from next door and used the neighbor's phone to contact the call center.

Unverified, indicates that this number has not been verified as the residence of the customer.

Initially, these fields may be blank or hold inaccurate information with the status field in the home group set to unverified. When a customer calls in for the first time, the database is searched to see if this number appears in any customer's record.

If no customer records are retrieved, then it can be initially assumed that this is a unique number, and it is stored in the first available entry in the caller's unique_number group of fields, its usage count is incremented and the date of use set.

If a number of customer records are retrieved, that show this is a shared number then the number is stored in the first available entry in the caller's shared_number group of fields, its usage count is incremented and the date of use set.

If a single customer record is retrieved, this shows that this number has previously been stored as a unique number of another customer; then the action taken depends on the setting of the associated status field in the retrieved record. If the status is verified, then the number can be stored in the caller's unique group of numbers with a status of secondary. If the status is unverified, then the initial assumption that this was a unique number was incorrect. The entry, in the retrieved database record, must be moved from the unique group of numbers to the shared group of numbers. The caller's database record must then be updated by storing the number in the first available entry in the caller's shared_ number group of fields, its usage count is incremented and the date of use set.

When the same customer calls in again, they may use a previous number or a new number. The database is searched to see if this telephone number appears in any of the customer database records. If the caller uses a previously recorded unique number, then its usage count is incremented and the date of use set. If the caller uses a previously recorded shared number, then its usage count is incremented and the date of use set. If the caller uses a new number, then the database is searched to see if this number appears in any other customer's database record. If no customer records are retrieved then, it can be initially assumed that this is another unique number and it is stored in the next available entry in the caller's unique_number group of fields, its usage count is incremented and the date of use set. If a number of customer records are retrieved, that show this is a shared number then the number is stored in the next available entry in the caller's shared_number group of fields, its usage count is incremented and the date of use set.

If a retrieved customer record indicates that this number has previously been stored as a unique number of another customer, then the action taken depends on the setting of the associated status field: If the status is verified, then the number can be stored in the caller's unique_number group with a status of secondary. If the status is unverified, then the initial assumption that this was a unique number was incorrect. The entry, in the retrieved database record, must be moved from the unique_number group to the shared_ number group of fields. The caller's database record must then be updated by storing the number in the first available entry in the caller's shared_number group of fields, its usage count is incremented and the date of use set. In this way over a length of time the records in the database will contain a number of entries in each of the two groups of numbers.

The usage count and date fields provide two functions, namely they:

a) allow the entries in each group to be placed in priority sequence, reducing the number of searches.

b) provide the information that allows a decision to be made as to which entry to discard when the number of telephone numbers exceeds the number of entries in either group.

The status field allows us to achieve two things: First, it identifies the real residence of the customer when there is more than one number of entries in the home number group. This field can not be set automatically using the telephony information. It can only be set using other information that the company may have about the customer or after an agent has asked the caller to verify which of the home numbers associated with this caller is the true home number. Outbound responses to abandoned calls will only be made to verified home numbers.

Second, it allows us to identify the "I've just popped in next door to call you" situation, where a customer has contacted the call center from a telephone number that is the home number of another customer. The use of this field means that a number is not automatically downgraded from unique to shared status just because it is associated with two accounts.

The embodiment of the invention provides the following advantages:

a) it automatically populates a customer database with the telephone numbers that the customers use.

b) it automatically differentiates between the customer calling from a unique or shared number.

c) it automatically maintains the currency of these telephones by recording how often they are used and the time they were last used.

d) it improves the chances that a customer's records will be retrieved from the database when they call the call center, as the database has the ability to store multiple telephone numbers for each customer which provides productivity improvements for the call center.

e) it enables the agent to greet the customer in the most appropriate manor.

In summary there is provided a system for maintaining a customer database in a computer telephony integrated (CTI) database. In particular it relates to populating and maintaining a customer database in a computer telephony system with shared and unique telephone numbers. There is described a method, apparatus and a computer program product relating to the processing records in a telephony database. The telephony system receives an ANI number along with an incoming call and uses that number to identify records, if any, in the customer database having telephone numbers that match the ANI number. A new record is created in the database if no record from the identified records corresponds to the incoming telephone call and the new record includes a telephone number field containing the ANI number. If one or more records were identified in the database, the telephone number in the new record is associated with a shared status.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or "step for."

As will be understood by one of ordinary skill in the art, computer programs such as that described herein are typically distributed as part of a computer program product that has a computer useable media or medium containing the program code. Therefore, "media," "medium," "computer useable medium," or "computer useable media," as used herein, may include a diskette, a tape, a compact disc, an integrated circuit, a programmable logic array (PLA), a remote transmission over a communications circuit, a remote transmission over a wireless network, such as a cellular network, or any other medium useable by computers with or without proper adapter interfaces. Note that examples of a computer useable medium include but are not limited to palpable physical media, such as a CD-ROM, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable or readable medium, as defined above, which bears or has embodied thereon any form of software or instructions to enable a computer system (or multiple cooperating systems) to operate according to the above-identified invention.

It will be likewise appreciated that the computer hardware upon which the invention is effected may contain one or more processors, operating together, substantially independently, or distributed over a network, and further includes memory for storing the instructions and calculations necessary to perform the invention.

Those skilled in the art will recognize that a system according to the present invention may be created in a variety of different ways known in the art. For example, a general purpose computing device may be configured with appropriate software so that the computing device functions as described. Furthermore, discrete electronic components may be used to create a system that implements all or part of the function. Finally, note that combinations of multiple computing devices running appropriate software or discrete electrical components can be used in like fashion. Essentially, the hardware is configured (whether by software, custom designed, etc.) to perform the functional elements making up the present invention.

We claim:

1. A method of processing records in a telephony database comprising:
    a) receiving an ANI number from an incoming call;
    b) identifying records, if any, in the database with telephone numbers that match said ANT number;
    c) creating a new record if no record from the identified records corresponds to the incoming telephone call, said new record including a telephone number field containing said ANI number; and
    d) assigning the telephone number in the new record a shared status if one or more records have been identified in the database, said shared status being an indication that the telephone number is shared by more than one caller.

2. A method as recited in claim 1 wherein each telephone number is associated with one of a unique type or a shared type.

3. A method as recited in claim 1 further comprising changing the status of each corresponding telephone number in more than one identified existing record to shared status if not already shared.

4. A method as recited in claim 1 further comprising associating the telephone number field with a unique status if no matching record is selected.

5. A method as recited in claim 1 further comprising associating the telephone number field with a verified or unverified status according to whether the shared or unique status has been confirmed or not.

6. A method as recited in claim 1 further comprising associating the telephone number with a primary or secondary status depending whether the value in the telephone number field is respectively the main phone number or another less used number.

7. A method as recited in claim 1 further comprising leaving unchanged the unique status associated with corresponding telephone number field in the located record if it is verified as unique and associating the new telephone number field with a secondary unique status.

8. A method as recited in claim 1 whereby the telephone field is associated with a usage count for indicating the number of times the record has been located by the value in the telephone number field.

9. A method as recited in claim 1 whereby the telephone field is associated with a date for indicating the date when the record was last selected.

10. An apparatus for processing records in a telephony database comprising:

a) means for receiving an ANT number from an incoming call;
b) means for identifying records, if any, in the database with telephone numbers that match said ANI number;
c) means for creating a new record if no record from the identified records corresponds to the incoming telephone call, said new record including a telephone number field containing said ANI number; and
d) means for assigning the telephone number in the new record a shared status indicating that the telephone number is shared by more than one caller if one or more records have been identified in the database.

11. An apparatus as recited in claim 10 wherein each telephone number is associated with one of a unique type or a shared type.

12. An apparatus as recited in claim 10 further comprising means for changing the status of each corresponding telephone number in more than one identified existing records to shared status if not already shared.

13. An apparatus as recited in claim 10 further comprising means for associating the telephone number field with a unique status if no matching record is selected.

14. An apparatus as recited in claim 10 further comprising means for associating the telephone number field with a verified or unverified status whereby the shared or unique status has been confirmed or not.

15. An apparatus as recited in claim 10 further comprising means for associating the telephone number with a primary or secondary status depending whether the value in the telephone number field is respectively the main phone number or another less used number.

16. An apparatus as recited in claim 10 further comprising means for leaving unchanged the unique status associated with corresponding telephone number field in the located record if it is verified as unique and associating the new telephone number field with a secondary unique status.

17. An apparatus as recited in claim 10 whereby the telephone field may be associated with a usage count for indicating the number of times the record has been located by the value in the telephone number field.

18. An apparatus as recited in claim 10 whereby the telephone field may be associated with a date for indicating the date when the record was last selected.

19. A computer program product comprising a computer readable medium, having thereon computer program code means, when said program is loaded, to make the computer execute a method to process records in a telephony database comprising the steps of:
a) receiving an ANI number from an incoming call;
b) identifying records, if any, in the database with telephone numbers that match said ANI number;
c) creating a new record if no record from the identified records corresponds to the incoming telephone call, said new record including a telephone number field containing said ANI number; and
d) associating the telephone number in the new record with a shared status if one or more records have been identified in the database, said shared status being an indication that the telephone number is shared by a group of people.

20. A product as recited in claim 19 wherein each telephone number is associated with one of a unique type or a shared type.

21. A product as recited in claim 19 wherein the method further comprises changing the status of each corresponding telephone number in more than one identified existing records to shared status if not already shared.

22. A product as recited in claim 19 wherein the method further comprises associating the telephone number field with a unique status if no matching record is selected.

23. A product as recited in claim 19 wherein the method further comprises associating the telephone number field with a verified or unverified status whereby the shared or unique status has been confirmed or not.

24. A product as recited in claim 19 wherein the method further comprises associating the telephone number with a primary or secondary status depending whether the value in the telephone number field is respectively the main phone number or another less used number.

25. A product as recited in claim 19 wherein the method further comprises leaving unchanged the unique status associated with corresponding telephone number field in the located record if it is verified as unique and associating the new telephone number field with a secondary unique status.

26. A product as recited in claim 19 whereby the telephone field may be associated with a usage count for indicating the number of times the record has been located by the value in the telephone number field.

27. A product as recited in claim 19 whereby the telephone field may be associated with a date for indicating the date when the record was last selected.

28. A method for maintaining customer records in a telephony database, comprising:
receiving an ANI number from an incoming call;
selecting a customer record previously stored in the database, the customer record including a telephone number;
comparing said telephone number in the selected record and the AN number of the incoming call and determining whether the telephone number matches the ANI number;
if the telephone number matches the ANT number:
determining whether the selected record corresponds to the incoming telephone call;
if the selected record does not correspond to the incoming telephone call, configuring the database to indicate the telephone number is shared by more than one caller.

29. The method of claim 28, further comprising:
if the telephone number matches the ANI number, displaying the selected record on a display.

30. The method of claim 28, wherein said determining whether the selected record corresponds to the incoming call includes querying a caller.

31. The method of claim 28, further comprising:
if the telephone number is determined not to match the ANI number, selecting a second customer record previously stored in said database.

32. The method of claim 28, further comprising:
if the selected record does not correspond to the incoming telephone call, selecting a second customer record previously stored in said database.

33. The method of claim 28, wherein said configuring includes storing the telephone number in a shared telephone number s database.

34. The method of claim 28, wherein said configuring includes storing a value in a database field to indicate that the telephone number is shared.

35. The method of claim 28, wherein the database is a relational database comprising:
a first database including one or more telephone numbers, wherein each telephone number contained therein is uniquely associated with a specified customer; and a second database including one or more telephone numbers, where in telephone number contained therein is associated with a plurality of specified customers.

36. A computer telephony integrated database system comprising:

at least one telephone for receiving an incoming call;

a database structure associating a customer telephone number with customer records;

a call management system configured to:
  receive an ANI number from the incoming call;
  identify records, if any, in the database with telephone numbers that match said ANI number;
  create a new record if no record from the identified records corresponds to the incoming telephone call, said new record including a telephone number field containing said ANI number; and
  associate the telephone number in the new record with a shared status, said shared status denoting that said telephone number is shared by different callers if one or more records have been identified in the database; and a user interface comprising:
  a display system for displaying data contained in the identified records;
  a user input device for selecting a one, if any, of the identified records that corresponds to the incoming call.

* * * * *

UNITED STATES PATENT AND TRADEMARK OFFICE
CERTIFICATE OF CORRECTION

PATENT NO. : 6,614,895 B1
DATED : September 2, 2003
INVENTOR(S) : Impey et al.

It is certified that error appears in the above-identified patent and that said Letters Patent is hereby corrected as shown below:

<u>Column 11,</u>
Line 1, please delete "ANT" and substitute -- ANI -- therefor;

<u>Column 12,</u>
Line 32, please delete "AN" and substitute -- ANI -- therefor;
Line 36, please delete "ANT" and substitute -- ANI -- therefor; and, <u>Column 13,</u>
Line 2, please delete "where in" and substitute -- wherein -- therefor.

Signed and Sealed this

Twenty-fourth Day of February, 2004

JON W. DUDAS
*Acting Director of the United States Patent and Trademark Office*